(12) United States Patent
Mishima et al.

(10) Patent No.: US 9,154,764 B2
(45) Date of Patent: Oct. 6, 2015

(54) MAP CONVERTING METHOD, MAP CONVERTING APPARATUS, AND COMPUTER PROGRAM PRODUCT FOR MAP CONVERSION

(75) Inventors: Nao Mishima, Tokyo (JP); Takeshi Mita, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 366 days.

(21) Appl. No.: 13/227,210

(22) Filed: Sep. 7, 2011

(65) Prior Publication Data

US 2012/0162200 A1 Jun. 28, 2012

(30) Foreign Application Priority Data

Dec. 22, 2010 (JP) ................... 2010-286657

(51) Int. Cl.
G06T 1/00 (2006.01)
G06T 15/00 (2011.01)
H04N 13/00 (2006.01)

(52) U.S. Cl.
CPC ................. H04N 13/0022 (2013.01)

(58) Field of Classification Search
CPC ......... G06T 7/0051; G06T 17/00; G06T 7/00; G06T 9/007; G06T 9/008; G06T 2207/10012; G06T 15/00; H04N 13/0022
See application file for complete search history.

(56) References Cited

U.S. PATENT DOCUMENTS

| 5,929,859 | A | 7/1999 | Meijers | |
|---|---|---|---|---|
| 2005/0244071 | A1* | 11/2005 | Zaharia et al. | 382/251 |
| 2007/0018977 | A1* | 1/2007 | Niem et al. | 345/422 |
| 2011/0142309 | A1* | 6/2011 | Zhang et al. | 382/128 |
| 2011/0181588 | A1 | 7/2011 | Barenbrug et al. | |

FOREIGN PATENT DOCUMENTS

| JP | 2001-298753 | 10/2001 |
|---|---|---|
| JP | 2006-31171 | 2/2006 |
| JP | 2006-186795 | 7/2006 |
| JP | 2010-279440 | 12/2010 |
| TW | 382093 | 2/2000 |
| TW | 201035907 A1 | 10/2010 |
| WO | WO 2009/139740 A1 | 11/2009 |

OTHER PUBLICATIONS

Machine translated: Hajime et al., JP,2006-031171.*
Machine translated: Kunio et al., JP,2006-186795.*
Notice of Rejection issued by the Japanese Patent Office on Oct. 16, 2012, for Japanese Patent Application No. 2010-286657, and English-language translation thereof.
Notification of the First Office Action issued by the State Intellectual Property Office of the People's Republic of China on Jan. 13, 2014, for Chinese Patent Application No. 201110266121.7, and English-language translation thereof.
Office Action dated Jun. 24, 2014, issued in Chinese Patent Application No. 201110266121.7.
Office Action dated Aug. 12, 2014, issued in Taiwan Patent Application No. 100132454.

* cited by examiner

*Primary Examiner* — Sing-Wai Wu
(74) *Attorney, Agent, or Firm* — Finnegan, Henderson, Farabow, Garrett & Dunner, L.L.P.

(57) ABSTRACT

According to an embodiment, a map converting method includes calculating existing frequency of depths in a first map, the first map corresponding to at least an image area of an image and each pixel of the first map representing a depth corresponding to a pixel of the image area; and first converting the first map into a second map that represents a depth in a first range for each pixel by using the existing frequency.

10 Claims, 8 Drawing Sheets

MAP CONVERTING METHOD, MAP CONVERTING APPARATUS, AND COMPUTER PROGRAM PRODUCT FOR MAP CONVERSION

CROSS-REFERENCE TO RELATED APPLICATION(S)

This application is based upon and claims the benefit of priority from Japanese Patent Application No. 2010-286657, filed on Dec. 22, 2010; the entire contents of which are incorporated herein by reference.

FIELD

Embodiments described herein relate generally to a map converting method, a map converting apparatus, and a program product for map conversion.

BACKGROUND

Conventionally, display devices (hereinafter, "3D display devices") have been developed, which display a three-dimensional image (hereinafter, "3D image") that represents depth, by using a stereo image that includes two images having a parallax difference between two viewpoints, and an image to which a depth map that illustrates the depth for each pixel of the image is attached. The range of depth (hereinafter, "depth range") that can be reproduced on the 3D display device varies from device to device. Furthermore, the depth range of an image input to the 3D display device (hereinafter, "input image") is different from the reproducible depth range of the 3D display device to which the image is output; and therefore the depth range of the input image needs to be converted (corrected) to a depth range suitable for the outputting 3D display device for displaying the 3D image. If the image is displayed on the 3D display device without performing conversion of the depth range, the front or back side of the image may become blurred, or the image may appear with insufficient depth. Methods of converting the depth range include a method of sequentially correcting the depth range so that a desired parallax amount can be achieved.

With some of the depth range converting methods of the conventional technologies, however, the depth after the conversion is excessively reduced so that the image output and displayed onto the 3D display device may look flat.

DETAILED DESCRIPTION

According to an embodiment, a map converting method includes: calculating existing frequency of depths in a first map, the first map corresponding to at least an image area of an image and each pixel of the first map representing a depth corresponding to a pixel of the image area; and first converting the first map into a second map that represents a depth in a first range for each pixel by using the existing frequency.

Various embodiments of a map converting method, a map converting apparatus, and a computer program product for the map conversion will be explained in detail below with reference to attached drawings.

First Embodiment

When receiving a stereo image including two images in which a parallax difference is produced between two viewpoints, a multi-parallax image including three images or more in which a parallax difference is produced among three viewpoints or more, or an image with which a depth map that represents a depth for each pixel of an image region including part of pixels of the image is associated, a map converting apparatus 1 according to the present embodiment converts the depth map to a depth map suitable for a target 3D display device so that a 3D image that represents depth by using these images can be displayed on the 3D display device. Although a depth map is not associated with a stereo image or a multi-parallax image, association of different viewpoint images is determined by stereo matching technology, and a depth map is thereby created. Similarly, when a two-dimensionally expressed image is to be displayed as a three-dimensional display and a depth map is separately created for the image and associated with the image, the image and the depth map can be input into the map converting apparatus 1. In the following description, it is assumed that an image with which a depth map is associated in advance is to be input, but the present embodiment is not limited thereto.

Figure 1:
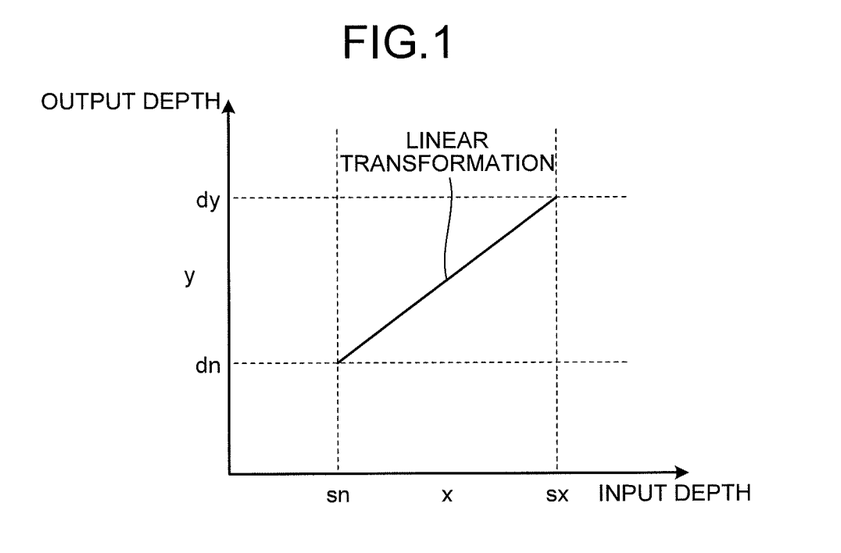
FIG. 1 is a diagram for illustrating an example of linear transformation for depth map conversion.
Figure 2:
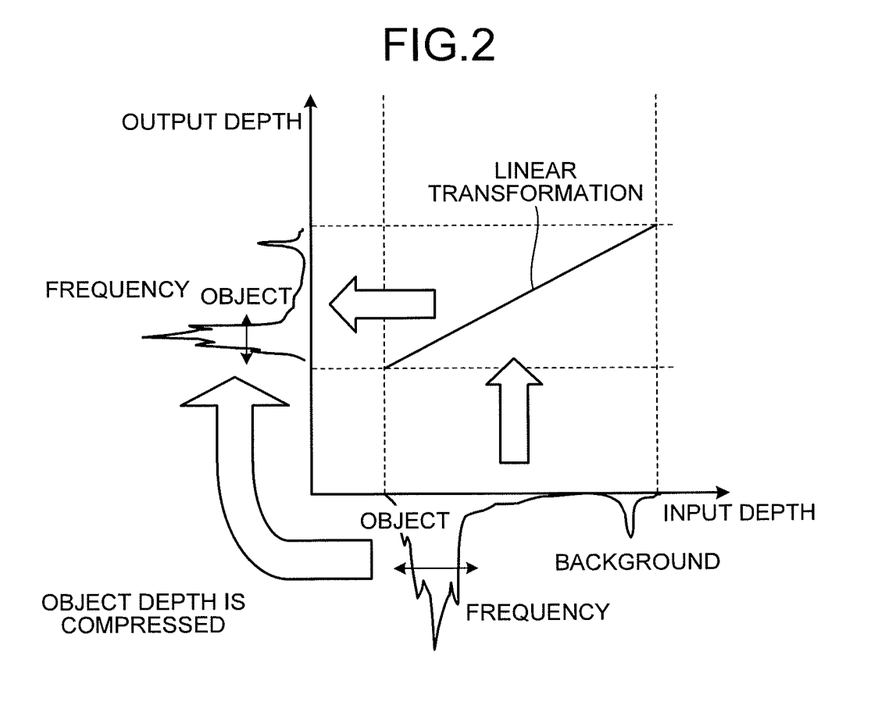
FIG. 2 is a diagram for explaining the depth map conversion using linear transformation.
Figure 3:
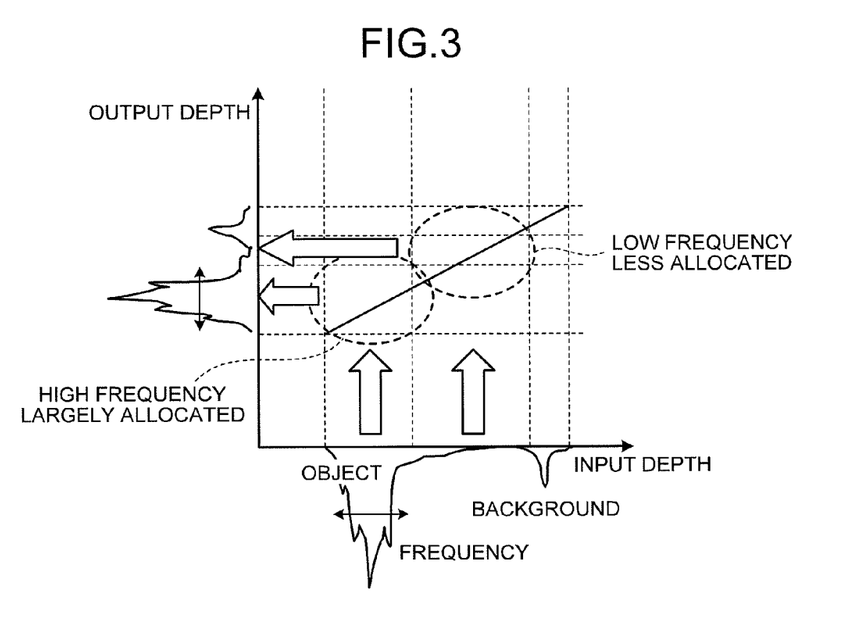
FIG. 3 is a diagram for explaining depth map conversion according to a first embodiment.

As a depth map converting method, linear transformation as illustrated in FIG. 1 may be considered. It is a depth map converting method using a linear function to convert and fit the depth range of an input image into and within the depth range of the outputting 3D display device. In this graph, the horizontal axis represents the depth for each pixel of an input image (input depth), and the vertical axis represents the depth for each pixel in the device that outputs the image (output depth). It illustrates that the depth range $sn \leq x \leq sx$ of the input image is converted into the depth range $dn \leq y \leq dy$ of the output. It is probable, however, that the linear transformation causes the following problem. For example, given that an image in which a large object appears in front and the background partially appears at the back. The histogram that represents existing frequency (frequency) of depth values is illustrated at the portion below the horizontal axis of the graph of FIG. 2. In this drawing, the depth of the front side in the three-dimensional space is illustrated at the left side of the graph, and the depth of the back side in the three-dimensional space is illustrated at the right side. In this example, an object with a large depth appears at the front side of the three dimensional space; while the background with some amount of depth appears partially at the back side. The entire depth range of such an input image is now to be studied to be compressed into a depth range reproducible on the outputting 3D display device by linear transformation. The presence frequency of depths in the outputting 3D display device is illustrated at the left side of the vertical axis of FIG. 2. As can be seen from this graph, the depth of the object in front is excessively compressed so that, when it is displayed on the 3D display device, the depth of the front object would look flattened. That is, the depth range in nature is so large that when it is fitted into and reproduced in a limited depth range, the depths of objects tend to be flattened. In other words, depending on the depth map converting method, the sense of depth of the object may be compromised. According to the present embodiment, the map converting apparatus 1 converts the depth map of an input image to a depth map that fits inside the depth range of the outputting device by use of a cumulative histogram representing the cumulative depth frequency so that an excellent sense of depth can be obtained in a reproducible depth range. When performing the depth map conversion, as illustrated in FIG. 3, the map converting apparatus 1 converts the depth for each one of the original pixels to a depth in an allocated range that becomes larger as the existing frequency is higher; while the device converts the depth to a depth in an allocated range that becomes smaller as the existing frequency is lower. In this manner, the object is prevented from being flattened. The structure for realizing this depth map conversion is described in detail below.

First, the hardware structure of the map converting apparatus 1 according to the present embodiment is explained. The map converting apparatus 1 according to the present embodiment includes: a controller such as a central processing unit (CPU) that controls the entire device; a main storage such as a read only memory (ROM) and a random access memory (RAM) that stores therein various types of data and programs; an auxiliary storage such as a hard disk drive (HDD) and a compact disk (CD) that stores therein various types of data and programs; and a bus that connects these units to one another. The device has a hardware structure of an ordinary computer. In addition, the map converting apparatus 1 may be connected individually to the above 3D display device; an operation input unit such as a keyboard and a mouse that receives instruction input by the user; and a communication interface that controls communications with external devices, with or without wires. The image with which the above depth map is associated is stored as image data representing a pixel value for each pixel in the auxiliary storage such as the HDD, together with the depth map. Moreover, the map converting apparatus 1 may include a receiving unit that receives airwaves so that the image data carried by the airwaves can be stored in the main storage and the auxiliary storage as image data of an image with which the depth map is associated.

Figure 4:
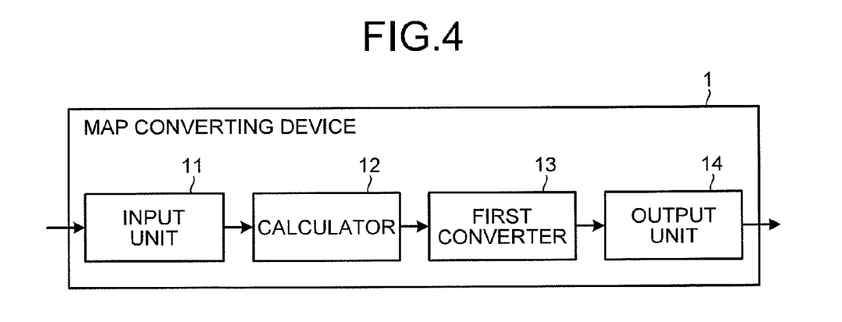
FIG. 4 is a diagram for illustrating an example of functional structure of a map converting apparatus.

Next, the functional structure of the map converting apparatus 1 having such a hardware structure is explained with reference to FIG. 4. The map converting apparatus 1 includes an input unit 11, a calculating unit 12, a first converter 13, and an output unit 14. These units are realized when the CPU of the map converting apparatus 1 implements the programs stored in the main storage and the auxiliary storage. The map converting apparatus 1 may further include a parallax image generating unit connected to the output unit 14, or may be connected to a parallax image generating unit belonging to a different image processing device, although these units are not illustrated in the drawing. A parallax image generating unit generates multiple images that produce a parallax difference when viewed from different viewpoints (hereinafter, "parallax images").

The input unit 11 receives input of a depth map that is associated with the image. A depth map represents the depth of an image area including part of the pixels of the image for each pixel, and it is assumed here that the value of the depth (hereinafter, "depth value") itself for each pixel is expressed. An image area that includes part of the pixels of an image may include all the pixels of the image, or may be a certain unit area such as a block, or a specific area that represents an object of the image such as a physical object and a person.

The calculator 12 uses the depth map received by the input unit 11 to calculate the existing frequency of the depth values represented by the depth map. According to the present embodiment, for example, the calculator 12 calculates a cumulative histogram that represents the cumulative existing frequency of the depth values illustrated in the depth map. The specific method of calculating the cumulative histogram will be described later in the description of the operation.

The first converter 13, for example, uses the cumulative histogram calculated by the calculator 12 to convert the depth map received by the input unit 11 into a depth map that represents depth values that fit within the depth range of the target 3D display device. The depth range of the target 3D display device should be acquired in advance by the first converter 13. The specific method of converting the depth map will be described later in the description of the operation.

The output unit 14 outputs the depth map converted by the first converter 13. The output unit 14 may output it to the parallax image generating unit, for example. When a resultant image obtained by suitably performing image processing onto the image corresponding to the depth map received by the input unit 11 and the depth map output by the output unit 14 are input to the parallax image generating unit; the parallax image generating unit then generates a parallax image based thereon. When the parallax image thus generated is output to the 3D display device, the parallax image is displayed as a 3D image on the 3D display device.

Next, the procedure of the map converting process performed by the map converting apparatus 1 according to the present embodiment is explained with reference to FIG. 5. When receiving the depth map associated with the image by the operation of the input unit 11 (step S1), the map converting apparatus 1 calculates the cumulative histogram by use of the depth map by the operation of the calculator 12 (step S2). More specifically, the calculator 12 first calculates, for example, a histogram that illustrates the existing frequencies of the depth values represented in the depth map. Here, x denotes the position of a pixel in the image (pixel position), z(x) denotes the depth value of the pixel on the depth map; and the possible range of the depth value (depth range) is determined as $0 \leq z(x) \leq 255$. The depth range is not limited thereto, however. The depth range of the target 3D display device is between $d_{min}$ and $d_{max}$. The integer form of the depth value z(x) at pixel position x is $z_i$ ($0 \leq i \leq 255$); the existing frequency of $z_i$ is $h(z_i)$; and the number of pixels in the image is N. Then, the calculator 12 initializes $h(z_i)$ to 0, and calculates the histogram by Expression (1).

$$h(z_i) \leftarrow h(z_i) + \frac{1}{N} \qquad (1)$$

The sign $\leftarrow$ denotes substitution of the right side into the left side. Expression (1) represents 1/N added to $h(z_i)$ as a value of the existing frequency of $z_i$ that is the integer form of the depth value. The calculator 12 calculates the existing frequency $h(z_i)$ for each value of i in accordance with Expression 1, where $0 \le i \le 255$, with reference to the depth values of all the pixels in the image area. The histogram for the existing frequency $h(z_i)$ calculated for each value of i from Expression 1 is a normalized histogram in which the value of the existing frequency of $z_i$ is normalized by the number of pixels in the image area. In other words, in the normalized histogram, the existing frequencies of the depth values represented on the depth map are normalized so that the probabilities of occurrence of the depth values are obtained. The calculator 12 converts the histogram representing the frequency of a value $z_i$ that is the integer form of the depth value for each value of i into a cumulative histogram representing the cumulative amount of existing frequencies of the value $z_i$ (hereinafter, "cumulative frequency"). Here, when the cumulative frequency of $h(z_i)$ is $c(i)$, and $c(-1)=0$, the calculator 12 calculates the cumulative frequency $c(i)$ from Expression (2) for each value of i, where $0 \le i \le 255$.

$$c(i) \leftarrow c(i-1) + h(z_i) \qquad (2)$$

Figure 6:
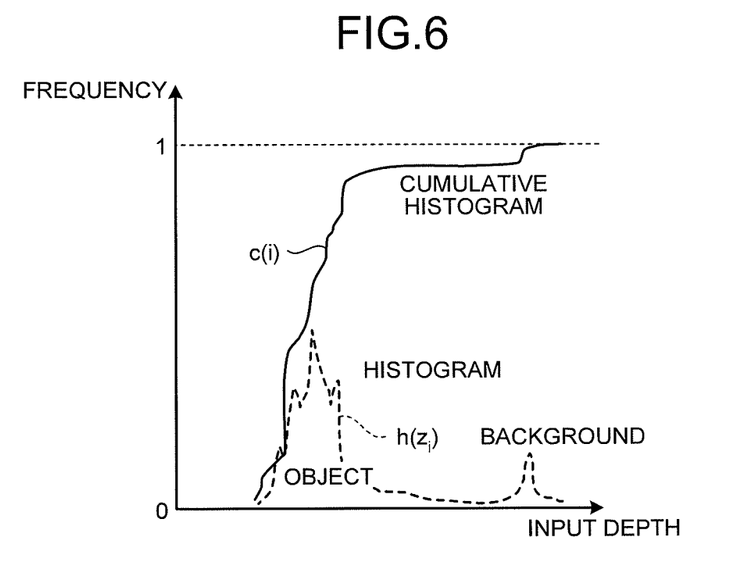
FIG. 6 is a diagram for illustrating an example of a cumulative histogram.

The cumulative frequency $c(i)$ calculated for each value of i from Expression (2) is illustrated in a cumulative histogram. FIG. 6 is an example cumulative histogram. In this histogram, the horizontal axis represents the depth value of the input image (input depth), and the vertical axis represents the existing frequency corresponding to the depth value. In this example, the cumulative frequency $c(i)$ accumulated in the range between 0 and 1 in correspondence with $h(z_i)$ for each value of i is expressed. As illustrated in this histogram, as the value $h(z_i)$ corresponding to the horizontal axis increases, the range of the value $c(i)$ of the vertical axis corresponding to the value $h(z_i)$ increases, while as the value $h(z_i)$ decreases, the value $c(i)$ corresponding to the value $h(z_i)$ decreases. In other words, the range of the depth in the outputting device corresponding to the depth of the input image having high existing frequency becomes large; while the range of the depth in the outputting device corresponding to the depth of the input image having low existing frequency becomes small.

The map converting apparatus 1 converts the depth map received at step S1 into the depth map illustrating the depth value in the depth range of the target 3D display device (first range) for each pixel by use of the cumulative histogram obtained at step S2 by the operation of the first converter 13 (step S3). More specifically, given that $z'(x)$ denotes the depth value on the depth map of the target device; and $[z(x)]$ denotes the integer form of the depth value $z(x)$. To obtain the integer form of the depth value $z(x)$, any integer function may be adopted. Here, the first converter 13 converts the depth value $z(x)$ to the depth value $z'(x)$ for each pixel position x from Expression (3).

$$z'(x) = (d_{max} - d_{min}) c([z(x)]) + d_{min} \qquad (3)$$

Because the minimum of $c(i)$, $c_{min}$, is not always 0, the first converter 13 may convert the depth value $z(x)$ to the depth value $z'(x)$ for each pixel position x, in accordance with Expression (4).

$$z'(x) = (d_{max} - d_{min}) c([z(x)]) + (1 + c_{min}) \cdot d_{min} - d_{max} \cdot c_{min} \qquad (4)$$

When the first converter 13 finishes converting the depth value $z(x)$ to the depth value $z'(x)$ for all the pixels of the image, the conversion of the depth map received at step S1 into the depth map that illustrates the depth value $z'(x)$ for every pixel has been completed.

Figure 7:
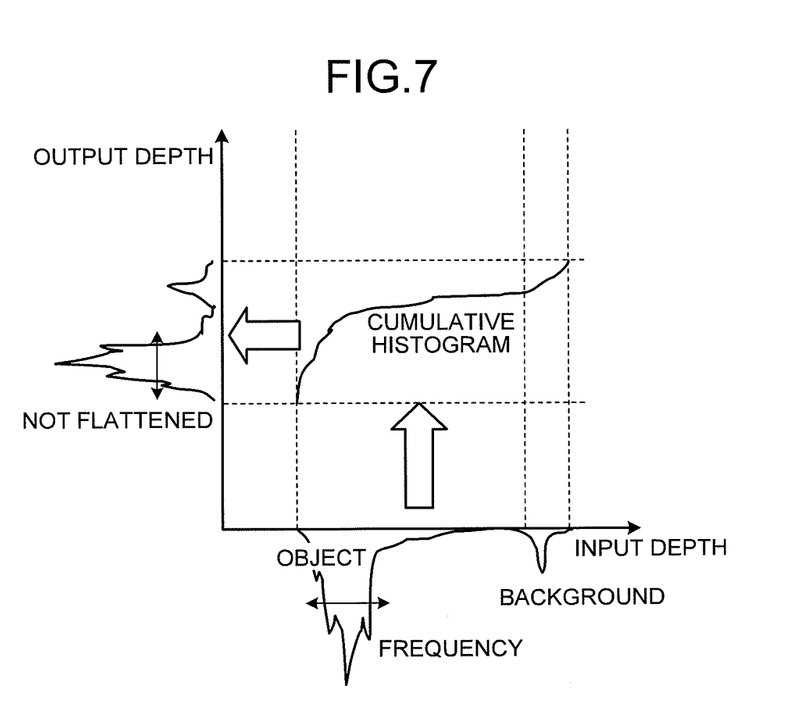
FIG. 7 is a diagram for explaining depth map conversion using a cumulative histogram.

FIG. 7 is a schematic diagram for illustrating the result of the depth range of the input image (second range) converted into the depth range (first range) of the outputting device in accordance with the cumulative histogram. This example illustrates that the depth of the input image is converted into a depth of an allocated range that becomes larger in the outputting device as the existing frequency of the depth of the input image is higher; while the depth is converted to a depth of an allocated range that becomes smaller in the outputting device as the existing frequency of the depth of the input image is lower.

Figure 5:
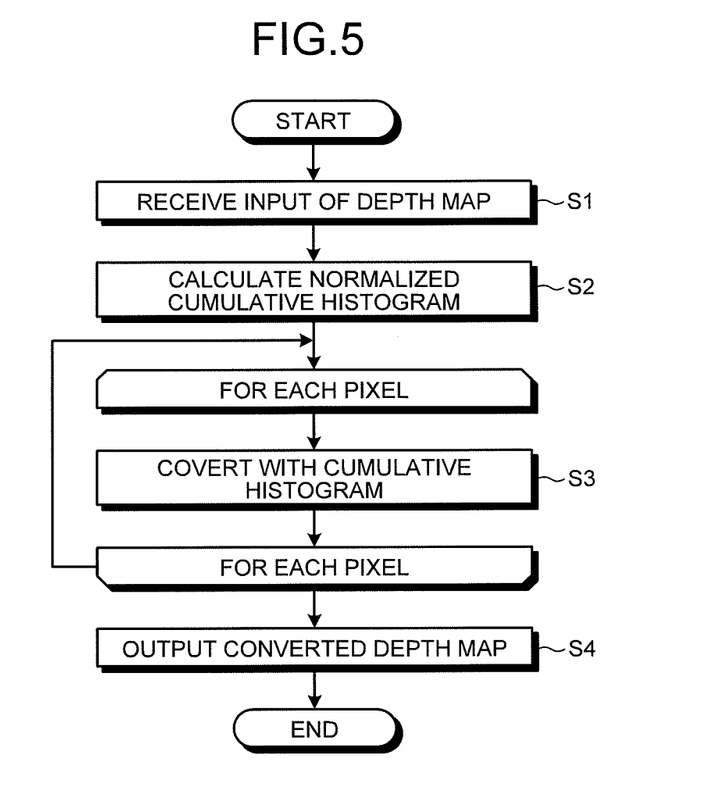
FIG. 5 is a flowchart of the procedure of a map converting process.

The explanation returns to FIG. 5. The first converter 13 outputs the depth map (step S4) converted at step S3. The depth map that is output here is input, for example, to the parallax image generating unit; and this depth map is used together with an image obtained by suitably performing image processing onto the image corresponding to the depth map received at step S1 to generate and output a parallax image onto a 3D display device. Then, the parallax image is displayed on the 3D display device as a 3D image.

In this manner, a cumulative histogram that represents the cumulative existing frequency of the depths is calculated for the depth map that represents the depth for each pixel of the image area including part of the pixels of an image for each pixel; and the depth map is converted by use of this histogram in such a manner that the depths fit within the depth range of the outputting device. Hence, the depth of an object that appears in the image can be converted with a large number of levels of scale, while the number of levels of scale can be reduced for small-depth space. The entire depth range of the input image can thereby fit into the depth range of the outputting device, and at the same time the depth of the object can be maintained. As a result, with the above structure, when a 3D image is displayed, a depth map can be converted in such a manner as to realize excellent depth sense within a reproducible depth range.

Second Embodiment

Next, the map converting method, the map converting apparatus, and the computer program product for map converting according to the second embodiment are explained. The same reference numerals may be used for portions that are the same as the first embodiment in the description, or the explanation thereof may be omitted.

The map converting apparatus 1 according to the first embodiment adopts a cumulative histogram so that the depth map of the input image is converted into a depth map that fits in a depth range of the outputting device while the sense of depth of an object that appears in the image is maintained, which cannot be achieved with the conventional technology using linear transformation. However, according to the conversion adopting the cumulative histogram, the sense of scale of the entire depth that has been maintained by the linear transformation may be lost. This is because the depth map is converted based on the depth frequency only; and the entire depth for pixels of the image tends to be compressed. A map converting apparatus 2 according to the present embodiment combines the basic conversion such as linear transformation with the conversion using a cumulative histogram, as explained in the first embodiment, to convert a depth map of an input image to a depth map that fits within a depth range of the outputting device.

Figure 8:
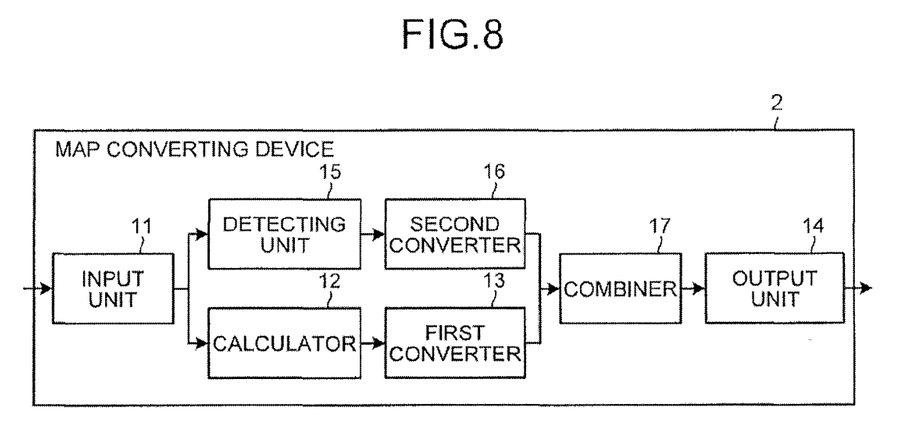
FIG. 8 is a diagram for illustrating an example of the functional structure of a map converting apparatus according to a second embodiment.

FIG. 8 is a diagram for illustrating the functional structure of the map converting apparatus 2 according to the present embodiment. The map converting apparatus 2 further includes a detecting unit 15, a second converter 16, and a combining unit 17, in addition to the input unit 11, the calculator 12, the first converter 13, and the output unit 14. These units are realized when the CPU of the map converting apparatus 2 implements various programs stored in the main storage or the auxiliary storage.

The detecting unit 15 detects the range of the depth value represented by the depth map received by the input unit 11. The second converter 16 uses the range detected by the detecting unit 15, and converts the depth map to a depth map that represents the depth values within the depth range of the target 3D display device by basic conversion with which the entire depth represented by the depth map received by the input unit 11 is evenly converted.

The combining unit 17 combines the depth map converted by the first converter 13 with the depth map converted by the second converter 16 by use of a blend constant α (0≤α≤1), and thereby converts the depth map received by the input unit 11 to the depth map representing the depth values within the depth range of the target 3D display device. The value of the blend constant α may be predetermined by the designer, or may be suitably determined and input by the user through the operation input unit.

Figure 9:
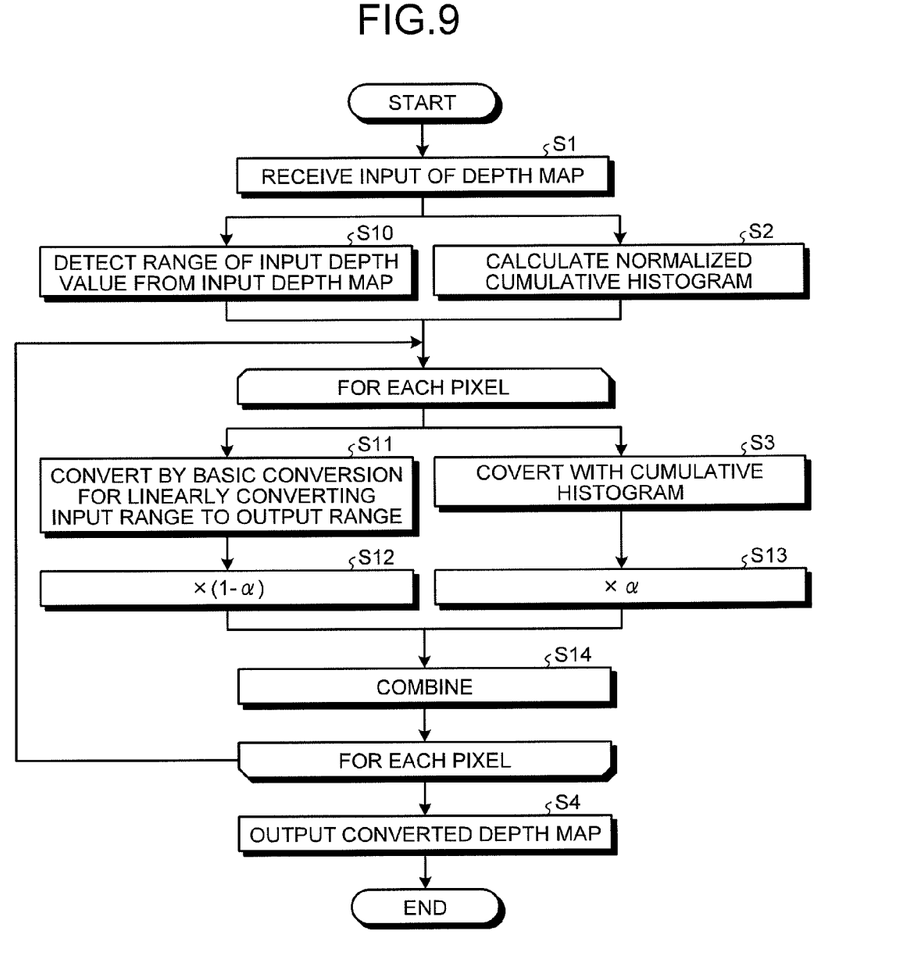
FIG. 9 is a flowchart of the procedure of a map converting process.

Next, the procedure of the map converting process performed by the map converting apparatus 2 according to the present embodiment is described with reference to FIG. 9. The operations of steps S1 to S4 are the same as the first embodiment. After step S1, the map converting apparatus 2 performs the operation of step S10, in addition to the operation of step S2. At step S10, the map converting apparatus 2 detects the range of the depth values represented by the depth map received at step S1, by the operation of the detecting unit 15. More specifically, the detecting unit 15 detects the minimum value $z_{min}$ and the maximum value $z_{max}$ by referring to all the depth values represented by the depth map, and thereby detects the range between the minimum value $Z_{min}$ and the maximum value $z_{max}$.

At step S11, using the range detected at step S10, the map converting apparatus 2 converts, for each pixel, the depth map received at step S1 to the depth map representing the depth values within the depth range of the target 3D display device, in accordance with the basic conversion by the operation of the second converter 16. The basic conversion may be linear transformation as illustrated in FIG. 1. More specifically, the second converter 16 converts the depth value z(x) into the depth value z"(x) for each pixel position x, in accordance with Expression (5). In the same manner as the first embodiment, z(x) is a depth value represented by the received depth map, and z"(x) is a depth value represented by the depth map of the outputting device.

$$z''(x) = \frac{d_{max} - d_{min}}{z_{max} - z_{min}} (z(x) - z_{min}) + d_{min} \qquad (5)$$

Figure 10:
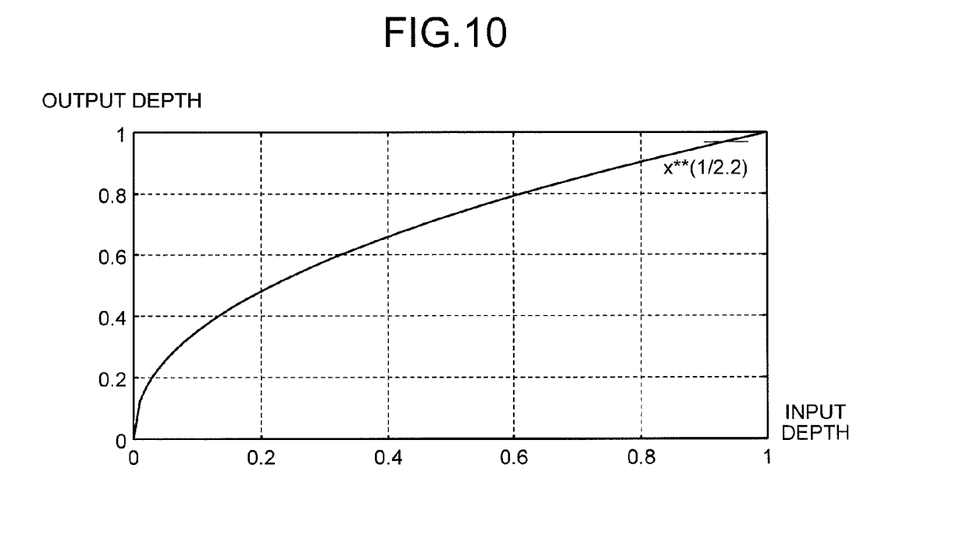
FIG. 10 is a diagram for illustrating an example of a gamma transform for depth map conversion.

Otherwise, the basic conversion may be gamma transform as illustrated in FIG. 10. In this situation, the second converter 16 converts the depth value z(x) into the depth value z"(x) for every pixel position x, in accordance with Expression (6).

$$z''(x) = (d_{max} - d_{min})\left(\frac{z(x)}{z_{max} - z_{min}}\right)^{\frac{1}{2.2}} + d_{min} \qquad (6)$$

Figure 11:
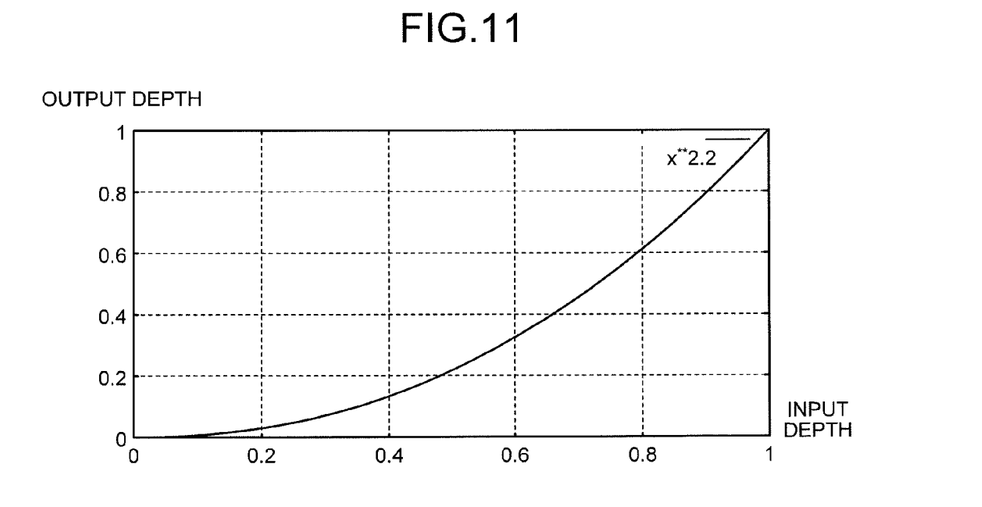
FIG. 11 is a diagram for illustrating an example of an inverse gamma transform for depth map conversion.

Furthermore, the basic conversion may be inverse gamma transform, as illustrated in FIG. 11. In this situation, the second converter 16 converts the depth value z(x) into the depth value z"(x) for each pixel position x, in accordance with Expression (7).

$$z''(x) = (d_{max} - d_{min})\left(\frac{z(x)}{z - z_{min}}\right)^{2.2} + d_{min} \qquad (7)$$

The conversion equation adopted by the second converter 16 is not limited to the above, and any conversion equation may be adopted as long as the entire depth can be evenly converted in the basic conversion.

At step S12, the map converting apparatus 2 multiplies the depth value z"(x) converted at step S11 for each pixel position x by 1-α by the operation of the combining unit 17, and at step S13, the map converting apparatus 2 multiplies the depth value z'(x) converted at step S3 by α. At step S14, the map converting apparatus 2 combines the depth value z"(x) with the depth value z'(x) to obtain the depth value z'''(x), in accordance with Expression (8).

$$z'''(x) = \alpha z'(x) + (1-\alpha)z''(x) \qquad (8)$$

Figure 12:
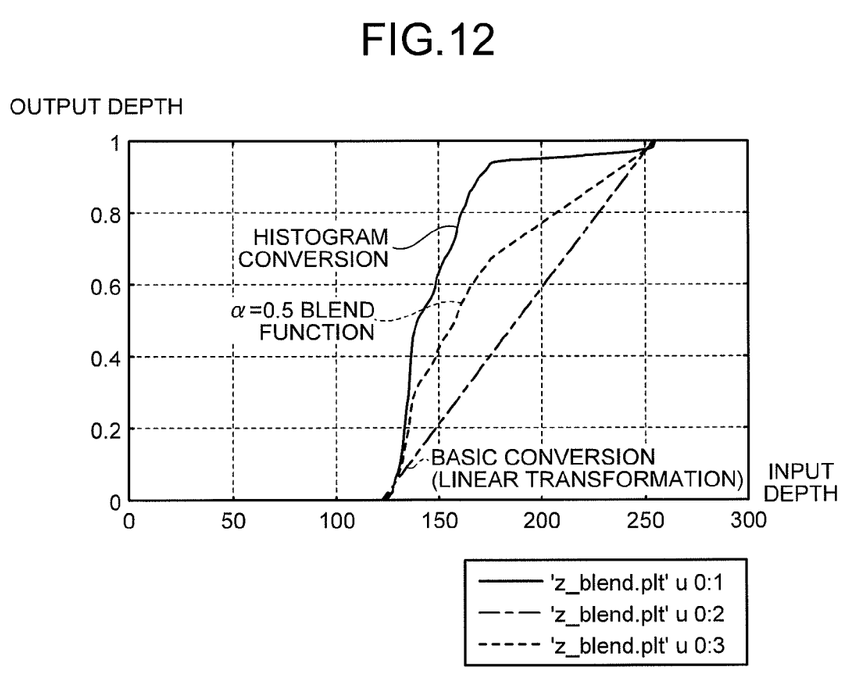
FIG. 12 is a diagram for illustrating an example of combination of cumulative histogram conversion and basic conversion.

FIG. 12 is a diagram for illustrating the conversion using the cumulative histogram, the basic conversion, and the conversion obtained from the combination, when α=0.5. The depth value z'''(x) is obtained from the blend function illustrated in this drawing, which is the combination of the conversion using the cumulative histogram and the basic conversion. Here, as the blend constant α increases, the ratio of the conversion using the cumulative histogram becomes larger; while as the blend constant α decreases, the ratio of the basic conversion becomes larger. The depth map, representing the depth value z'''(x) obtained from such a blend function for each pixel, serves as a final depth map converted from the depth map of the input image to be suitable for the target 3D display device. In other words, the map converting apparatus 2 converts the depth map received at step S1 into the depth map that represents a depth value obtained for each pixel by combining the depth value converted at step S3 by use of the cumulative histogram with the depth value converted by the basic conversion at step S11. In this manner, the map converting apparatus 2 combines the depth map converted by use of the cumulative histogram with the depth map converted by the basic conversion for each pixel, and thereby converts the depth map of the input image to the depth map of the target 3D display device.

Thereafter, at step S4, the map converting apparatus 2 outputs the depth map converted at step S14.

With the above structure, the entire depth range of the input image can fit into the depth range of the outputting device, and the depth of an object that appears in the image can be maintained. Furthermore, the sense of scale of the entire depth can also be maintained. Hence, the above structure can realize the depth map conversion for display of a 3D image, in such a manner as to provide an excellent sense of depth within a reproducible depth range.

Modifications

The present invention is not limited to the above-mentioned embodiments, and its structural components may be modified without departing from the scope at the time of implementation. In addition, various embodiments can be offered by suitably combining the structural components disclosed in the above embodiments. For example, some of the structural components of the embodiments may be omitted.

The structural components of different embodiments may be suitably combined. Furthermore, various modifications may be made, as illustrated below.

According to the above embodiments, various programs implemented on the image processing device may be stored in a computer connected to a network such as the Internet, and may be downloaded by way of the network. In addition, various programs may be stored in the form of installable or executable files, in a computer-readable recoding medium such as a CD-ROM, a flexible disk (FD), a CD-R, and a digital versatile disk (DVD) and may be provided as a computer program product.

According to the above embodiments, a histogram is adopted to indicate the depth existing frequency; and a cumulative histogram that represents the cumulative existing frequency of the depth by use of this histogram is adopted. However, the existing frequency of the depth and its cumulative existing frequency are not limited thereto.

When performing the map converting process onto all the pixels of the image, the map converting apparatuses 1 and 2 according to the above embodiments may acquire a depth map for every block or for every specific region to perform the map converting process.

According to the above embodiments, the depth map represents the depth values of an image area including part of the pixels of an image, but the depth map is not limited thereto. The depth map may indicate a parallax difference for each pixel for the depth of the image area including part of the pixels of the image. Depth values and parallax differences establish a one-to-one correspondence. For this reason, the map converting apparatuses 1 and 2 calculate a cumulative histogram for a depth map that represents a parallax difference for the depth of an image area including part of the pixels of the image for each pixel in the same manner as the above embodiments; and, by using this cumulative histogram, the map converting apparatuses 1 and 2 convert the depth map into a depth map suitable for the target 3D display device so that the depth map conversion can obtain an excellent depth sense within a reproducible depth range.

According to the second embodiment, the basic conversion is not limited to the above examples, as long as the entire depth represented by the depth map of the input image can be evenly converted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A map converting method, comprising:
   obtaining a first map, the first map corresponding to a particular image and representing depths of pixels in at least part of the particular image;
   calculating existing frequencies of depths in the first map and a cumulative histogram that represents cumulative existing frequencies of the depths of the first map;
   first converting the first map into a second map by using the cumulative histogram, each depth in the second map being within a first range;
   second converting the first map into a third map that represents the depth in the first range for each pixel by a basic conversion with which an entire depth represented by the first map is evenly converted, each depth in the third map being within the first range; and
   generating a fourth map by combining the second map multiplied by a blend constant with the third map multiplied by a complement of the blend constant, wherein the blend constant is a predetermined value.

2. The method according to claim 1, wherein, in the first converting,
   the depth for each pixel represented by the first map is converted into a depth of an allocated range that becomes larger in the second map as the existing frequencies are higher, and is converted into a depth of an allocated range that becomes smaller in the second map as the existing frequencies are lower.

3. The method according to claim 1, wherein the blend constant is a fixed predetermined value.

4. The method according to claim 1, wherein the blend constant is determined by a user.

5. The method according to claim 1, wherein the first map is calculated by using pixel values in at least part of the particular image.

6. The method according to claim 1, wherein the first range is determined according to a display device to which the fourth map is outputted.

7. The method according to claim 1, wherein
   the calculating includes calculating the existing frequencies for the first map that represent a depth for each pixel of the at least part of the particular image based on a depth value of a second range.

8. The method according to claim 1, wherein
   the calculating includes calculating the existing frequencies for the first map that represent a depth for each pixel of the at least part of the particular image based on a parallax of a second range.

9. A map converting apparatus, comprising:
   a map generator configured to obtain a first map, the first map corresponding to a particular image and representing depths of pixels in at least part of the particular image;
   a calculator configured to calculate existing frequencies of depths in the first map and a cumulative histogram that represents cumulative existing frequencies of the depths of the first map;
   a first converter configured to convert the first map into a second map by using the cumulative histogram, each depth in the second map beginning within a first range;
   a second converter configured to convert the first map into a third map by using a linear function with which an entire depth in the first map is evenly converted, each depth in the third map being within the first range; and
   a third converter configured to convert the second and third maps to a fourth map by combining the second map multiplied by a blend constant with the third map multiplied by a complement of the blend constant, wherein the blend constant is a predetermined value.

10. A computer program product comprising a non-transitory computer-readable medium including programmed instructions for map converting, wherein the instructions, when executed by a computer, cause the computer to perform:
    obtaining a first map, the first map corresponding to a particular image and representing depths of pixels in at least part of the particular image;
    calculating existing frequencies of depths in the first map and a cumulative histogram that represents cumulative existing frequencies of the depths of the first map;

first converting the first map into a second map by using the cumulative histogram, each depth in the second map being within a first range;

second converting the first map into a third map that represents the depth in the first range for each pixel by a basic conversion with which an entire depth represented by the first map is evenly converted, each depth in the third map being within the first range; and generating a fourth map by combining the second map multiplied by a blend constant with the third map multiplied by a complement of the blend constant, wherein the blend constant is a predetermined value.

* * * * *